Feb. 11, 1941. W. A. SMITH, JR 2,231,302
VALVE FOR ROCK DRILLS
Filed June 19, 1939
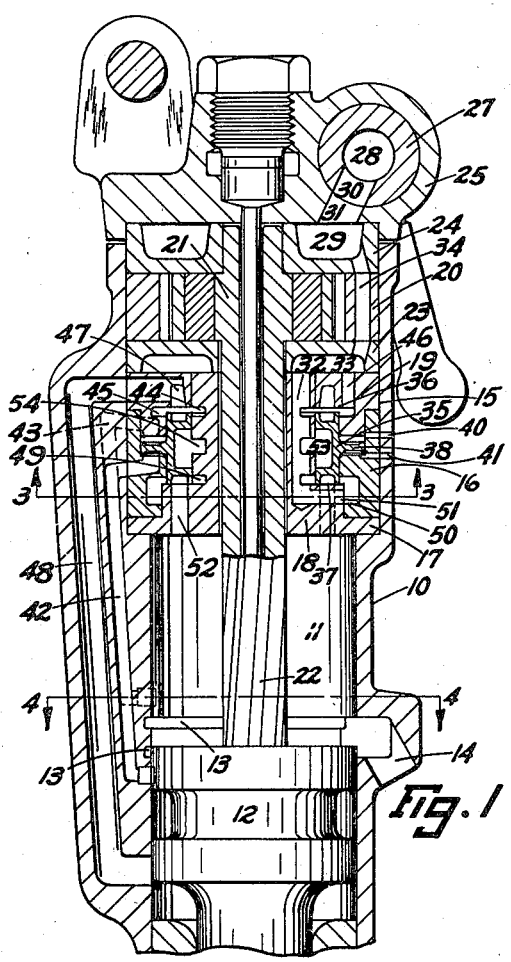
INVENTOR
WILLIAM A. SMITH JR.
BY
ATTORNEY Patented Feb. 11, 1941

2,231,302

UNITED STATES PATENT OFFICE 2,231,302

VALVE FOR ROCK DRILLS

William A. Smith, Jr., Cleveland, Ohio, assignor to The Cleveland Rock Drill Company, Cleveland, Ohio, a corporation of Ohio Application June 19, 1939, Serial No. 279,785

7 Claims. (Cl. 121—19)

This invention relates broadly to fluid actuated rock drills, but more particularly to a motive fluid distributing valve therefor.

One object of this invention is to produce a rock drill with an efficient motive fluid distributing valve which is simple in construction and readily responsive to the action of the motive fluid.

Another object of this invention is to produce a valve for rock drills capable of rapid and efficient distribution of the motive fluid resulting in the fast reciprocation of the piston.

Other objects and advantages more or less ancillary to the foregoing and the manner in which the various objects are attained reside in the specific construction and aggroupment of the elements peculiar to this structure, as will become apparent from a more complete examination of this specification, in the claims of which there are assembled certain specific combinations of parts and specific constructions indicative of the scope and spirit of the invention.

In the drawing:

Fig. 1 is a longitudinally sectional view of a portion of a rock drill illustrating the invention.

Fig. 2 is a view similar to Fig. 1 showing the movable parts in another position.

Fig. 3 is a cross sectional view taken in a plane indicated by line 3—3 in Fig. 1.

Fig. 4 is a cross sectional view taken in a plane indicated by line 4—4 in Fig. 1.

Referring to the drawing, 10 represents a cylinder formed with a piston chamber 11 having a piston 12 reciprocable therein for delivering impacts to the drill steel in the usual manner. Intermittent its ends, the cylinder 10 is provided with two longitudinally spaced exhaust grooves 13 leading to the atmosphere through an exhaust port 14.

The rear end of the cylinder 10 is formed with a counterbore 15 having disposed therein a valve cap 19 and a valve casing 16 resting on the annular flange 17 of a valve bushing 18, which flange is seated on the bottom of the counterbore 15.

Also located within the counterbore 15, there is the usual rotation mechanism including a stationary ratchet ring 20 having rotatable therein the head 21 of a rifle bar 22, which bar extends through the valve bushing 18 in the piston 12 for operative engagement with a corresponding nut (not shown). Between the valve cap 19 and the ratchet ring 20 there is interposed a plate 23 on which rests the head 21 of the rifle bar. Above the ratchet ring 20 there is also mounted a bearing plate 24 held in position by a back head 25 rigidly secured to the cylinder 10 by side bolts 26.

Rotatable within the back head 25, there is a throttle valve 27 formed with a central bore 28 having motive fluid admitted therein from any suitable source, which bore is capable of communication with a large recess 29 provided within the bearing plate 24 through a valve port 30 and a back head port 31.

Referring now more particularly to the invention, the bushing 18 extends upwardly to the plate 23 and is provided with a plurality of inlet ports 32 leading from an annular recess 33 formed within the plate 23, which recess is in communication with the recess 29 of the bearing plate 24 through a plurality of ports 34 extending through the ratchet ring 20. The valve block 16 and valve cap 19 are internally shaped to accommodate a sleeve-like valve 35 slidably mounted on the bushing 18 between two annular valve seats 36 and 37, the former being formed within the valve cap 19, while the latter is provided on the bushing 18 adjacent the flange 17. The seats 36 and 37 are engageable by the adjacent ends of the valve 35 for limiting the strokes of the valve as well as controlling admission of the motive fluid into the piston chamber 11 as will be explained later. Intermediate its ends, the valve 35 is provided with an external annular flange 38 slidably mounted within a chamber 39 formed between the valve block 16 and the valve cap 19, which chamber has its ends above and below the flange 38 constantly opened to the atmosphere through small vents 40 and 41 respectively. Also leading from the chamber 39 below the valve flange 38, there is a kick port 42 opening into the piston chamber 11 below the exhaust groove 13, and leading from the same chamber above the valve flange 38, there is a similar kick port 43 opening into the piston chamber 11 above the exhaust grooves 13.

Level with the valve seat 36, the bushing 18 is provided with an external groove 44 opening into the inlet passages 32 and being located opposite an internal groove 45 provided within the valve cap 19, which groove 45 is in constant communication with the recess 33 of the plate 23 through inlet ports 46. The valve seat 36 is also provided with an annular groove 47 of a lesser width than that of the end of the valve 35, and in communication with the front end of the piston chamber 11 through one or more inlet passages 48.

Level with the lower valve seat 37, the bushing 18 is provided with another external groove 49 also opening into the inlet passages 32 and located opposite an internal groove 50 formed within the valve casing 16 and in constant communication with the inlet ports 32 via radial ports 51 extending through the bushing 18 below the valve seat 37. Leading from the valve seat 37 to the rear end of the piston chamber 11, there is a plurality of inlet ports 52 capable of being closed by the adjacent end of the valve 35 as will be hereinafter explained.

Intermittent its ends, the valve 35 is formed with an annular recess or storage chamber 53 which is in constant communication with the inlet ports 32 through an annular groove 54 formed on the bushing 18.

In the operation, when the parts are positioned as shown in Fig. 1, motive fluid from the throttle valve bore 28 will flow into the recess 29 of the bearing plate 24 via the valve port 30 and back head port 31. From the recess 29, the motive fluid will flow into the similar recess 33 of the plate 23 via the inlet ports 34, and therefrom into the bushing inlet ports 32 and groove 44. Simultaneously, motive fluid from the recess 33 will also flow into the internal groove 45 through the inlet ports 46, which ports and grooves just above referred to constitute motive fluid supplying passageways leading to the valve seat 36 from the interior and the exterior thereof. With the valve engaging the valve seat 37 or spaced from the valve seat 36, the motive fluid supply to this last valve seat will also flow into the annular groove 47 from the interior and the exterior thereof, and therefrom into the front end of the piston chamber 11, via the inlet passages 48, to act on the piston 12 for driving it rearwardly. During this flow of the motive fluid over the upper end of the valve 35, the motive fluid will exert pressure on that end of the valve for maintaining it in the position shown in Fig. 1. During its rearward stroke, the piston will first uncover the kick port 42 thereby admitting pressure fluid on the lower surface of the valve flange 38, which surface is larger than that of the end or holding surface of the valve adjacent the valve seat 36, thereby causing the valve to shift to the position shown in Fig. 2.

In this new position, the upper end of the valve engaging the valve seat 36 is shutting off the supply of the motive fluid into the groove 47, consequently preventing further admission of the motive fluid into the front end of the piston chamber 11 through the inlet ports 48. The valve now being spaced from the valve seat 37 will enable supply of motive fluid to that seat from the ports 32 via the grooves 49 and 50, and from the valve seat 37 into the rear end of the piston chamber 11 through the inlet passages 52. In this instance the motive fluid flowing over the valve seat 37 will act on the adjacent end of the valve for holding the valve in its new position. The motive fluid admitted into the rear end of the piston chamber 11 will act on the piston 12 for driving it downwardly to deliver its impact to the drill steel in the usual manner. During its downward movement, the piston will first uncover the kick port 43 thereby admitting motive fluid on the upper surface of the valve flange 38, which surface is greater than the front end or holding surface of the valve 35, thereby causing the valve to shift in the position shown in Fig. 1.

Subsequent to each shifting of the valve 35, it will be understood that the motive fluid admitted to the lower or the upper surface of the valve flange 38 is free to exhaust therefrom to the atmosphere via the vents 40 and 41, and that motive fluid is finally free to exhaust from the piston chamber 11 through the exhaust port 14 in a manner well-known in tools of this type.

The storage chamber 53 provided within the valve 35, in addition to reducing the weight of the valve, also acts as a storage place for the motive fluid from where a sufficient and rapid supply may be effected to the front and rear ends of the piston chamber 11.

From the foregoing description, it will be understood that the end surfaces of the valve are engageable with their adjacent valve seats for controlling the admission of the motive fluid into the piston chamber 11. As previously explained, the groove 47 as well as the inlet passages 51 have motive fluid admitted therein internally as well as externally of their marginal edges, thereby effecting a rapid admission of the motive fluid to the front and rear ends of the piston chamber 11.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a fluid actuated rock drill, a cylinder having a piston chamber and a piston reciprocable therein, an exhaust port for the piston chamber, a valve casing having opposed annular valve seats formed therein, a sleeve valve reciprocable within said casing capable of end engagement with said seats, means for supplying motive fluid to said seats from the interior and the exterior of the marginal edges thereof, inlet passages leading from said seats to the piston chamber, an external annular flange on said valve forming opposed actuating areas intermittently exposed to pressure fluid controlled by the piston for actuating the valve and causing intermittent engagement of its ends with said valve seats to control communication of said motive fluid supplying means with said inlet passages, and opposed holding areas on the ends of said valve exposed to motive fluid supplied to said inlet passages for momentarily holding the valve in end engagement with one or the other of said valve seats.

2. In a fluid actuated rock drill, a cylinder having a piston chamber and a piston reciprocable therein, an exhaust port for the piston chamber, a valve casing having opposed annular valve seats formed therein, a sleeve valve reciprocable within said casing capable of end engagement with said seats, passageways for supplying motive fluid to said seats from the interior and the exterior of the marginal edges thereof, a motive fluid storing chamber in the interior of said valve in constant communication with said passageways, inlet passages leading from said seats to the piston chamber, opposed valve actuating surfaces intermediate the ends of said valve intermittently exposed to pressure fluid controlled by the piston for actuating the valve and causing intermittent engagement of its ends with said valve seats to control communication of said passageways with said inlet passages, and opposed holding areas on the ends of said valve exposed to motive fluid supplied to said inlet passages for momentarily holding the valve in end engagement with one or the other of said valve seats.

3. In a fluid actuated rock drill, a cylinder having a piston chamber and a piston reciprocable therein, an exhaust port for the piston chamber, a valve casing having opposed annular valve seats formed therein, a sleeve valve reciprocable within said casing capable of end engagement with said seats, passageways for supplying motive fluid to said seats from inside and outside of the seats, inlet passages leading from said seats to the piston chamber, opposed valve actuating surfaces intermediate the ends of said valve, kick ports controlled by the piston leading from said piston chamber to said surface for intermittently admitting motive fluid to said surfaces for actuating the valve and causing intermittent engagement of its ends with said valve seats to control communication of said passageways with said inlet passages, and opposed holding areas on said valve exposed to motive fluid supplied to said inlet passages for momentarily holding the valve in end engagement with one or the other of said valve seats.

4. In a fluid actuated rock drill, a cylinder having a piston chamber and a piston reciprocable therein, an exhaust port for the piston chamber, a valve casing having opposed annular valve seats formed therein, a valve bushing within said casing, a sleeve valve reciprocable on said bushing, means for supplying motive fluid to said valve seats from the interior and the exterior of the seats including passageways through said bushing, inlet passages leading from said seats to the piston chamber, opposed valve actuated surfaces intermediate the ends of said valve intermittently exposed to pressure fluid controlled by the piston for actuating the valve and causing intermittent engagement of its ends with said seats to control communication of said passageways with said inlet passages, and opposed holding areas on the ends of said valve exposed to motive fluid supplied to said passages for momentarily holding the valve in end engagement with one or the other of said valve seats.

5. In a fluid actuated rock drill, a cylinder having a piston chamber and a piston reciprocable therein, a valve casing having opposed annular valve seats formed therein, a valve bushing within said casing, means for supplying motive fluid to said valve seats from the interior and the exterior of the marginal edges thereof, inlet passages leading from said valve seats between the marginal edges thereof to said piston chamber, and a slidable sleeve valve surrounding said bushing engageable with said valve seats for controlling supply of motive fluid thereto.

6. In a fluid actuated rock drill, a cylinder having a piston chamber and a piston reciprocable therein, a rotation mechanism including a rifle bar operatively associated with said piston and extending upwardly therefrom, a valve casing through which said rifle bar passes, longitudinally spaced concentric annular valve seats within said valve casing, means for supplying motive fluid to said valve seats from the interior and the exterior of the marginal edges thereof, inlet passages leading from said valve seats to said piston chamber, and a valve surrounding said rifle bar operatively engageable with said valve seats for controlling supply of motive fluid thereto.

7. In a fluid actuated rock drill, a cylinder having a piston chamber and a piston reciprocable therein, a valve casing having a bushing extending longitudinally therein, two sets of radially spaced motive fluid supplying passageways within said casing, an annular land between the outlet ends of the passageways of each set forming two opposed annular valve seats, inlet passages leading from said seats to said piston chamber, and a sleeve valve slidable on said bushing capable of end engagement with said seats for controlling supply of motive fluid from said passageways to said inlet passages.

WILLIAM A. SMITH, Jr.